(12) United States Patent
Yang et al.

(10) Patent No.: US 7,347,609 B2
(45) Date of Patent: Mar. 25, 2008

(54) DIRECT BACKLIGHT MODULES

(75) Inventors: Cheng-Lin Yang, Taoyuan (TW); Pong Lai, Taipei (TW); Huang-Chen Guo, Kaohsiung (TW); Shuang-Chao Chung, Taoyuan (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 11/006,678

(22) Filed: Dec. 8, 2004

(65) Prior Publication Data

US 2006/0050533 A1   Mar. 9, 2006

(30) Foreign Application Priority Data

Sep. 3, 2004   (TW) .............................. 93126661 A

(51) Int. Cl.
*F21V 7/04*   (2006.01)
(52) U.S. Cl. .................. 362/619; 362/620; 362/614
(58) Field of Classification Search ................ 362/600, 362/607, 609, 611, 613, 614, 619, 620, 625, 362/626, 561
See application file for complete search history.

(56) References Cited

U.S. PATENT DOCUMENTS

| | | | |
|---|---|---|---|
| 5,748,828 A * | 5/1998 | Steiner et al. .............. | 385/146 |
| 6,280,063 B1 * | 8/2001 | Fong et al. .................. | 362/333 |
| 6,356,389 B1 * | 3/2002 | Nilsen et al. ............... | 359/625 |
| 6,709,122 B2 * | 3/2004 | Adachi et al. ................ | 362/27 |
| 6,880,946 B2 * | 4/2005 | Mullen ........................ | 362/627 |
| 6,883,950 B2 * | 4/2005 | Adachi et al. .............. | 362/555 |
| 6,996,296 B2 * | 2/2006 | Bastiaansen et al. .......... | 385/11 |
| 2003/0184993 A1 | 10/2003 | Yamada | |
| 2004/0233657 A1 * | 11/2004 | Lin .............................. | 362/31 |

FOREIGN PATENT DOCUMENTS

CN   24316174   * 5/2001

* cited by examiner

*Primary Examiner*—Jacob Y. Choi
(74) *Attorney, Agent, or Firm*—Birch, Stewart, Kolasch & Birch, LLP

(57) ABSTRACT

Direct backlight modules are provided. A direct backlight module includes a liquid crystal panel, a plurality of light tubes disposed below the liquid crystal panel, a reflecting plate disposed below the light tubes, and a transparent plate disposed between the light tubes and the liquid crystal panel. Additionally, a lens array is formed on one surface of the transparent plate facing the light tubes and a prism array is formed on the other surface of the transparent plate facing the liquid crystal panel.

9 Claims, 5 Drawing Sheets

22

DIRECT BACKLIGHT MODULES

BACKGROUND

The invention relates to direct backlight modules, and in particular to direct backlight modules with transparent plates having microstructure to facilitate illumination uniformity.

FIG. 1a is a side view of a conventional direct backlight module. Some light emitting from illumination tubes 4 directly passes through a diffusion plate 8a and a diffusion sheet 7 to a liquid crystal display 2; the reminder is reflected by a reflecting plate 5 and then passes through the diffusion plate 8a and the diffusion sheet 7 to the liquid crystal display 2. To attain uniform brightness in the liquid crystal display 2, the diffusion plate 8a is formed of opaque resin. A great deal of light is, however, inevitably lost.

FIG. 1b is a side view of another conventional direct backlight module. As shown in FIG. 1b, the diffusion plate 8b is constructed by irregularly meshed dot distribution to provide an even brightness for the liquid crystal display 2. The dot distribution, however, reduces light transmission efficiency.

US Patent No. 2003/0184993, as shown in FIG. 1c, discloses a direct backlight module having a lens array 8d on a translucent substrate 8c as well as a diffusion sheet 7 disposed between a liquid crystal display 2 and illumination tubes 4. The light emitting from the illumination tubes 4 is condensed while passing through the lens array 8d. Further, the condensed light travels forward while diverging, and is then diffused by the diffusion sheet 7, and finally illuminates the liquid crystal display 2. Although this direct backlight module can help avoid the absorption of light, the light passing through the lens array 8d will crossly diverge such that a great deal of light will illuminate the liquid crystal panel 2 beyond the viewable angle. Thus, brightness on the liquid crystal display 2 cannot effectively be increased.

SUMMARY

Direct backlight modules are provided. An exemplary embodiment of a direct backlight includes a liquid crystal panel, a plurality of light tubes disposed below the liquid crystal panel, a reflecting plate disposed below the light tubes, and a transparent plate disposed between the light tubes and the liquid crystal panel. Additionally, a lens array is formed on one surface of the transparent plate facing the light tubes and a prism array is formed on the other surface of the transparent plate facing the liquid crystal panel.

DESCRIPTION OF THE DRAWINGS

Direct backlight modules can be more fully understood by reading the subsequent detailed description and examples with references made to the accompanying drawings, wherein.

DETAILED DESCRIPTION

Figure 1A:
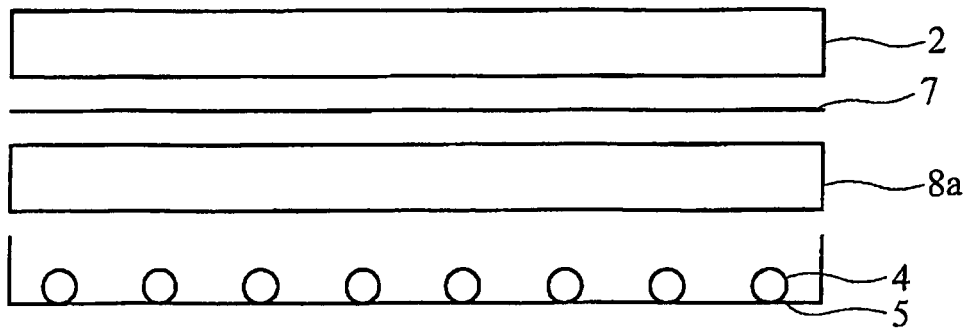
FIG. 1a is a side view of a conventional direct backlight module.
Figure 1B:
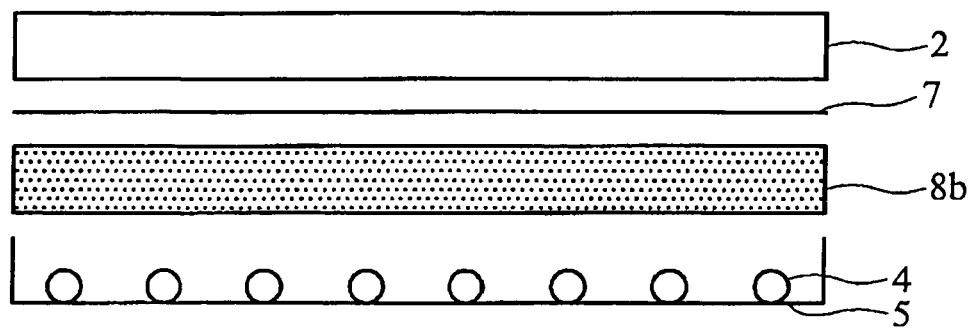
FIG. 1b is a side view of another conventional direct backlight module.
Figure 1C:
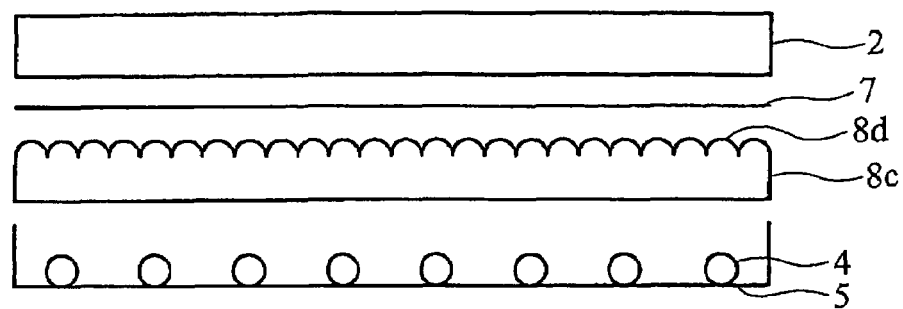
FIG. 1c is a side view of another conventional direct backlight module.
Figure 2:
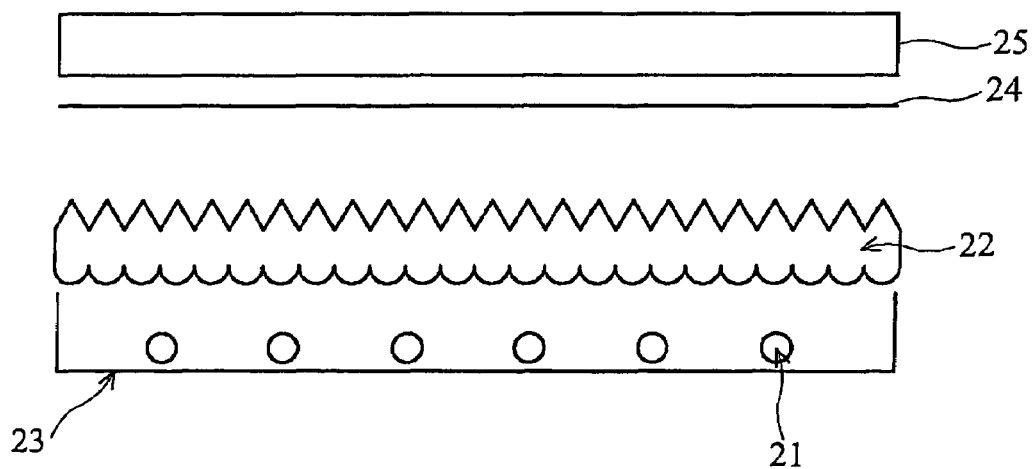
FIG. 2 is a side view showing an outline of an embodiment of a direct backlight module.

Direct backlight modules will be described in greater detail in the following. Please refer to FIG. 2. FIG. 2 shows a side view of an embodiment of a direct backlight module. The direct backlight module comprises a plurality of light tubes 21, a reflecting plate 23, a diffusion sheet 24, a liquid crystal panel 25, and a transparent plate 22. The light tubes 21 are disposed between the reflecting plate 23 and the transparent plate 22 as light sources and the reflecting plate 23 is disposed below the light tubes 21 to reflect light toward the liquid crystal panel 25. Furthermore, the transparent plate 22 comprises highly penetrable plastic capable of allowing light to pass through. Thus, by means of changing the light path, the transparent plate 22 can substantially facilitate the uniformity and the brightness.

Figure 3A:
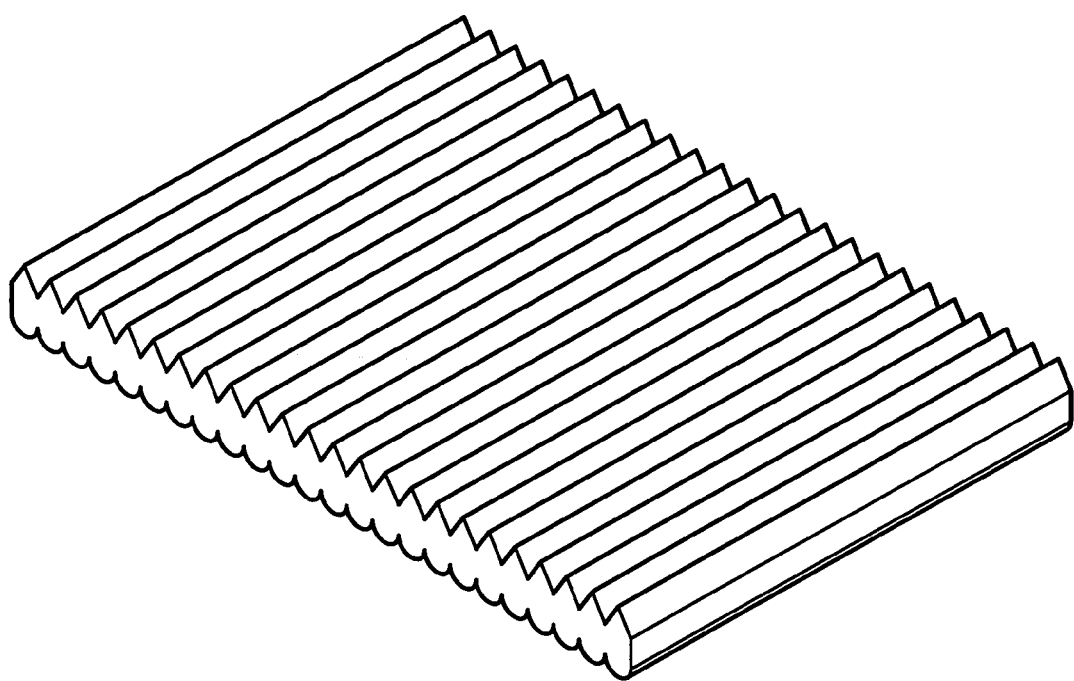
FIG. 3a is a three-dimensional view of an embodiment of a double-faced microstructure transparent plate in FIG. 2.
Figure 3B:
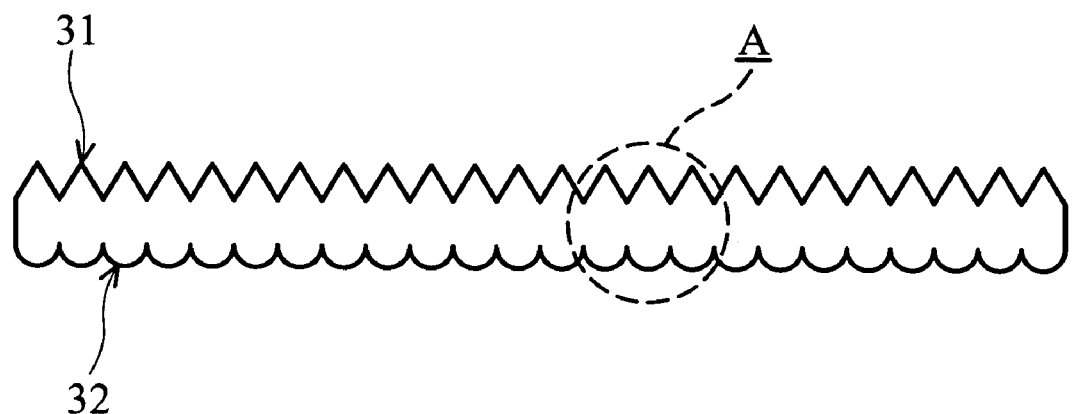
FIG. 3b is a side view of an embodiment of a double-faced microstructure transparent plate in FIG. 2.

As shown in FIG. 3a, FIG. 3a is a three-dimensional view of the transparent plate 22. Referring next to FIG. 3b showing a side view of the transparent plate 22, the transparent plate 22 is formed with a double-faced microstructure having a lens array 32 formed on one surface of the transparent plate 22 facing the light tubes 21 and a prism array 31 formed on the other surface of the transparent plate 22 facing the liquid crystal panel 25. The lens array 32 and the prism array 31 are periodically arranged and also extend along the same direction as the light tubes 21 to effectively control the light path.

Figure 4:
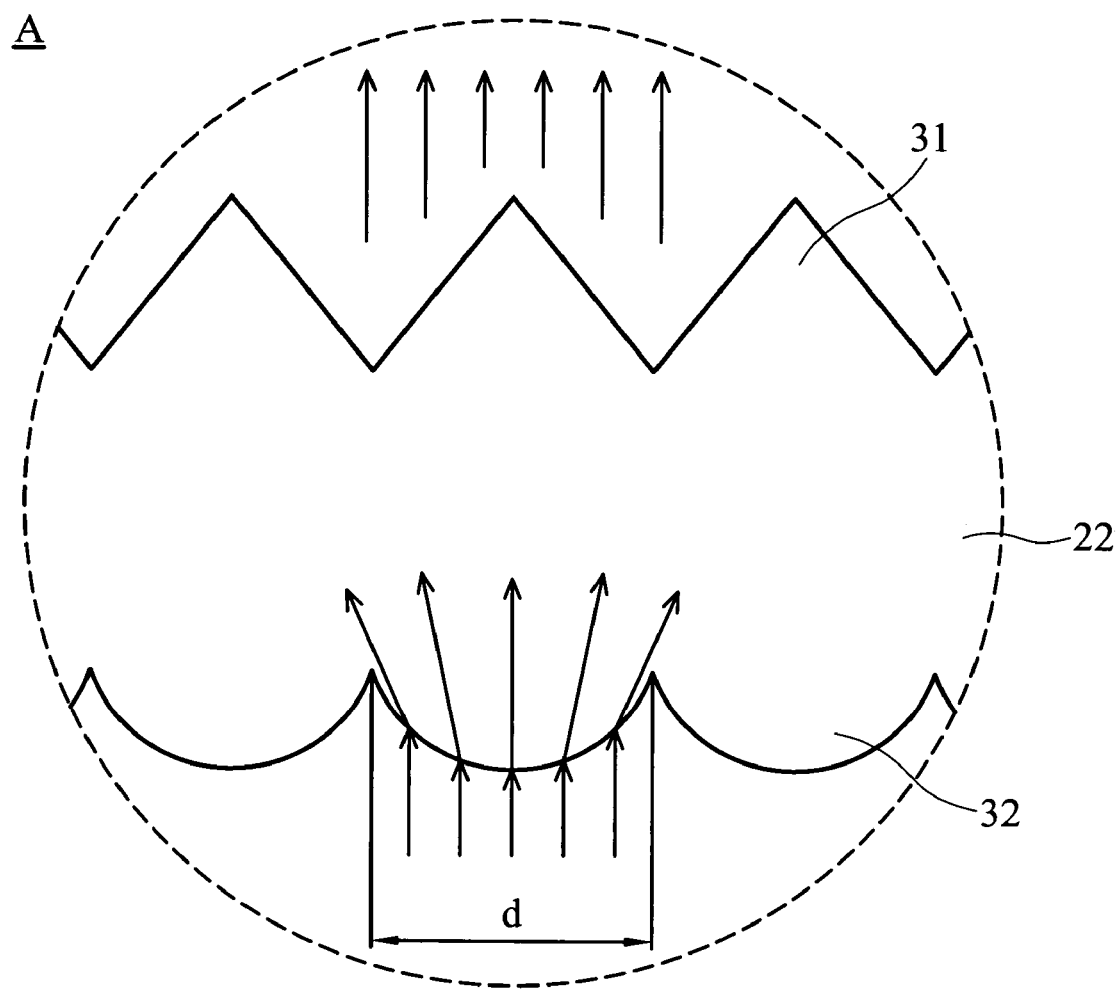
FIG. 4 shows the light path passing through the double-faced microstructure transparent plate of the invention.

Finally, please refer to FIG. 4. FIG. 4 is a partially enlarged diagram A of the transparent plate 22. As shown in FIG. 4, the light passing through the lens array 32 will diverge and then be condensed when passing through the prism array 31.

Hence, the light under control can substantially decrease the loss of the light and illuminate the liquid crystal panel within the viewable angle. Simultaneously, the brightness of the liquid crystal panel can be substantially improved.

Additionally, the prism array (first lenses) 31 and the lens array (second lenses) 32 may be preferably arranged with a width d ranging from several microns to hundreds of microns.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A direct backlight module, comprising: a liquid crystal panel; a plurality of light tubes disposed directly below the liquid crystal panel; a reflecting plate disposed below the light tubes; and a transparent plate, disposed between the light tubes and the liquid crystal panel, having: a lens array, formed on the surface of the transparent plate and facing the light tubes, wherein the lens array comprises a plurality of first lens, and first lenses being half-circled, and a prism array, formed on the other surface of the transparent plate and facing the liquid crystal panel, wherein the prism array comprises a plurality of second lenses, the second lenses being triangular, said first and said second lenses having a same period, with each of the said first being align with one corresponding second lens, and the light passes the lens array and the prism array in sequence to be transmitted toward the liquid crystal panel.

2. The directed backlight module as claimed in claim 1, wherein the lens array is periodically arranged.

3. The direct backlight module as claimed in claim 1, wherein the prism array is periodically arranged.

4. The direct backlight module as claimed in claim 1, wherein the lens array extends along the same direction as the light tubes.

5. The direct backlight module as claimed in claim 1, wherein the prism array extends along the same direction as the light tubes.

6. The direct backlight module as claimed in claim 1, wherein the transparent plate comprises plastic.

7. The direct backlight module as claimed in claim 1, wherein a width of each first lens ranges from several microns to hundreds of microns.

8. The direct backlight module as claimed in claim 1, wherein a width of each second lens ranges from several microns to hundreds of microns.

9. The direct backlight module as claimed in claim 1, wherein a width of each first lens equals a width of each second lens.

* * * * *